United States Patent
Shanmugam et al.

(10) Patent No.: US 11,233,904 B1
(45) Date of Patent: Jan. 25, 2022

(54) INTERBOT COMMUNICATION

(71) Applicant: Bank of America Corporation, Charlotte, NC (US)

(72) Inventors: Maruthi Z. Shanmugam, Plano, TX (US); Nishant H. Shah, Indian Land, SC (US); Chris Welles, Charlotte, NC (US); David Randall, Charlotte, NC (US); Kiran Kadekoppa, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/325,381

(22) Filed: May 20, 2021

(51) Int. Cl.
*H04M 3/51* (2006.01)
*G05B 13/02* (2006.01)
*H04M 3/42* (2006.01)

(52) U.S. Cl.
CPC ...... *H04M 3/5166* (2013.01); *G05B 13/0265* (2013.01); *H04M 3/42221* (2013.01)

(58) Field of Classification Search
CPC .......... H04M 3/5166; H04M 3/42221; H04M 3/5191; G05B 13/0265
USPC .... 379/265.09, 265.05, 265.01, 265.11, 242, 379/265.12, 265.13, 265.14, 266.01
See application file for complete search history.

(56) References Cited

U.S. PATENT DOCUMENTS

| | | | |
|---|---|---|---|
| 10,929,485 B1* | 2/2021 | Chew | G06F 16/9038 |
| 2019/0012390 A1* | 1/2019 | Nishant | G06F 16/248 |
| 2019/0104093 A1* | 4/2019 | Lim | G06F 11/1471 |
| 2019/0266287 A1* | 8/2019 | Chen | G06F 9/547 |

* cited by examiner

*Primary Examiner* — Thjuan K Addy
(74) *Attorney, Agent, or Firm* — Weiss & Arons LLP

(57) ABSTRACT

Apparatus and methods for gathering information from layered bots. The apparatus may be configured to run an instance of a user-facing bot. The platform may be configured to send to a selected support bot a back-end query. The platform may be configured to receive from the selected support bot an "OPEN" conversation status for the conversation. The platform may be configured to receive, after receiving the "OPEN" conversation status: a response to the back-end query; and a status update for the conversation status. The status update may be "WAITING". The platform may be configured to repeat (a) through (c) below until the status update is "CLOSED": (a) acquire from the user a responsive supplemental fact; (b) transmit to the contact bot the responsive supplemental fact; (c) receive from the contact bot: a response to the supplemental fact; and a status update for the conversation status.

21 Claims, 10 Drawing Sheets

INTERBOT COMMUNICATION

BACKGROUND

User access to robotic information servers and analysis engines is typically limited by the complexity of relationships between information robots ("bots"). Bots that are tuned for precision may require a high level of user sophistication, and may have slow throughput. Bots that are tuned for user-friendliness may be limited in precision.

It would therefore be desirable to provide apparatus and methods for robotic information services.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

Figure 1:
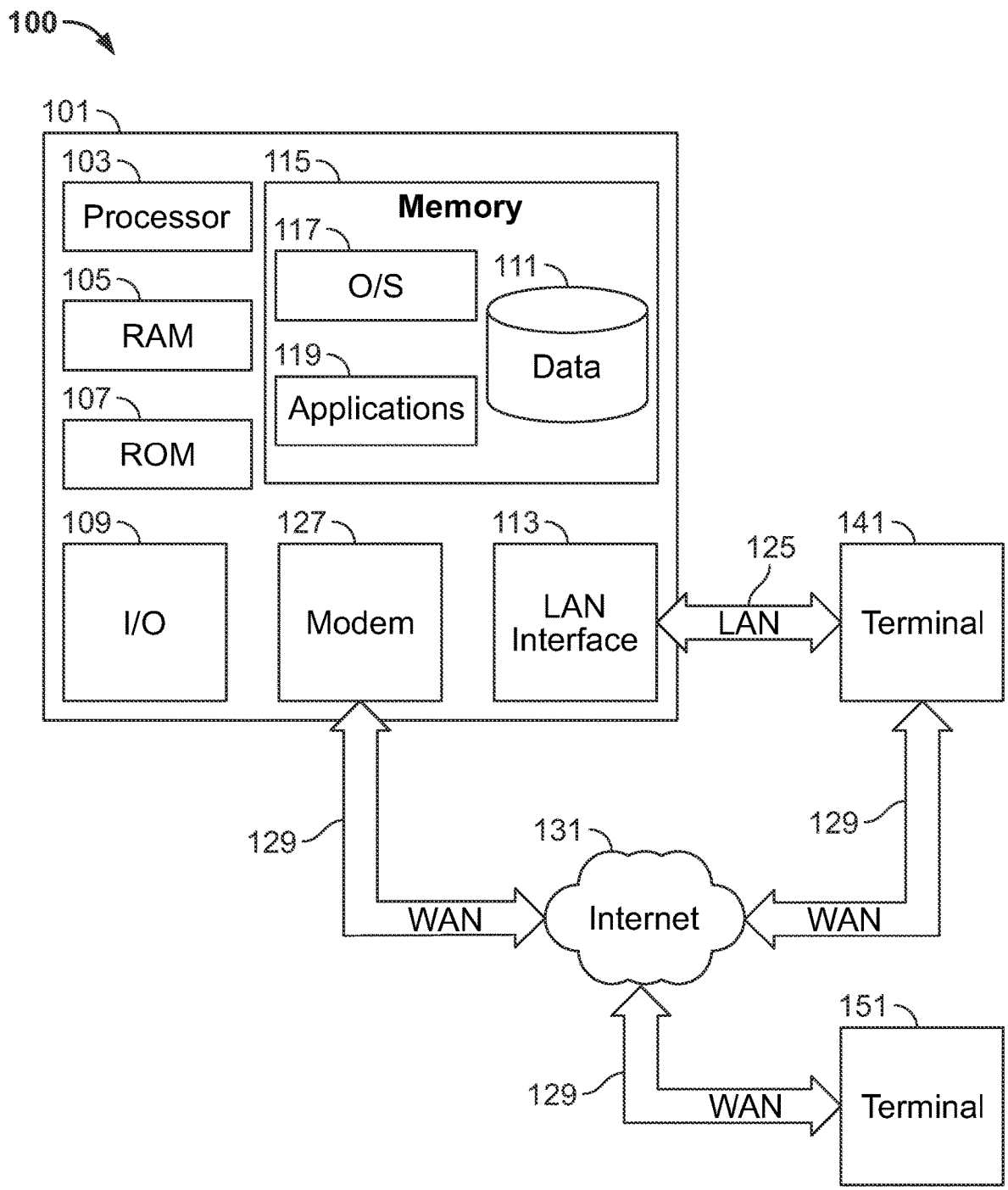
FIG. 1 shows illustrative apparatus in accordance with principles of the invention.

Generally, the leftmost digit (e.g., "L") of a three-digit reference numeral (e.g., "LRR"), and the two leftmost digits (e.g., "LL") of a four-digit reference numeral (e.g., "LLRR"), identify the first figure in which a part is called-out.

SUMMARY

Apparatus and methods for gathering information from layered bots are provided. The apparatus and methods may involve a robotic information services architecture that includes a hybrid of a shallow but fast user-facing bot and artificial intelligence research support bots. The platform may be configured to receive, using a user-facing bot, a user inquiry. The platform may be configured to select, based on the inquiry, a support bot from the support bots. The platform may be configured to initiate a conversation with the selected support bot. The platform may be configured to send to the selected support bot a back-end query. The platform may be configured to receive from the selected support bot an "OPEN" conversation status for the conversation. The platform may be configured to receive, after receiving the "OPEN" conversation status: a response to the back-end query; and a status update for the conversation status. The status update may be "WAITING". The platform may be configured to repeat (a) through (c) below until the status update may be "CLOSED": (a) acquire from the user a responsive supplemental fact; (b) transmit to the contact bot the responsive supplemental fact; (c) receive from the contact bot: a response to the supplemental fact; and a status update for the conversation status.

DETAILED DESCRIPTION

Apparatus and methods for gathering information from layered bots are provided. The apparatus may include a digital information platform. The platform may be configured to run an instance of a user-facing bot. The platform may be configured to distribute an interbot communication protocol to one or more support bots. All of the support bots may derive intelligence from a common artificial intelligence ("AI") engine. Each of the support bots may derive intelligence from a designated AI engine that is different from the AI engines of the other support bots. The platform may be configured to engage in conversations between users and the support bots. The platform may be configured to receive, using a user-facing bot, a user inquiry. The platform may be configured to select, based on the inquiry, a support bot from the support bots. The support bots may include a first support bot that operates under a first proprietary artificial intelligence ("AI") protocol. The support bots may include a second support bot that operates under a second proprietary AI protocol that is different from the first AI protocol. The platform may be configured to initiate a conversation with the selected support bot. The platform may be configured to send to the selected support bot a back-end query. The platform may be configured to receive from the selected support bot an "OPEN" conversation status for the conversation. The platform may be configured to receive, after receiving the "OPEN" conversation status: a response to the back-end query; and a status update for the conversation status. The status update may be "WAITING". The platform may be configured to repeat (a) through (c) below until the status update may be "CLOSED": (a) acquire from the user a responsive supplemental fact; (b) transmit to the contact bot the responsive supplemental fact; (c) receive from the contact bot: a response to the supplemental fact; and a status update for the conversation status.

The conversation may be performed over a web socket interface.

The user inquiry may include a text message.

The back-end query may include a text message.

The response to the back-end query may include a text message.

The response to the back-end query may include a text message.

The user inquiry may be one of over 100,000,000 user inquiries received in a 24-hour period by the user-facing bot.

When the conversation is a first conversation, the platform may be configured to, after receiving a status update that is "CLOSED": select a new support bot; initiate a second conversation with the new support bot; and reply to the user inquiry based on the second conversation.

The methods may include a method for gathering information from layered bots.

The methods may include receiving, using a user-facing bot, a user inquiry. The methods may include selecting, based on the inquiry, a support bot from a plurality of bots, the plurality of bots including: a first support bot that: was developed by a first entity; and operates under a first proprietary artificial intelligence ("AI") protocol; and a second support bot that: was developed by a second entity; and operates under a second proprietary AI protocol that is different from the first proprietary AI protocol. The methods may include initiating a conversation with the selected support bot. The methods may include sending to the selected support bot a back-end query. The methods may include receiving from the contact bot an "OPEN" conversation status for the conversation. The methods may include receiving, after receiving the "OPEN" conversation status: a response to the back-end query; and a status update for the conversation status, the status update being "WAITING". The methods may include repeating (a) through (c) below until the status update may be "CLOSED": (a) acquiring from the user a responsive supplemental fact; (b) transmitting to the contact bot the responsive supplemental fact; (c) receiving from the contact bot: a response to the supplemental fact; and a status update for the conversation status.

The methods may include after receiving the user inquiry: determining, for each of two or more support bots, a correlation of the user inquiry against subject-matter profiles corresponding to the support bots. The methods may include rejecting the correlations. The methods may include repeating (a) through (d) below, until a correlation exceeds a threshold: (a) obtaining from the user a clarification; (b) determining, for each of two or more support bots, a correlation of the clarification against subject-matter profiles corresponding to the support bots; (c) comparing the correlations to a predetermined correlation threshold; and (d) transmitting to the user a clarification inquiry.

The methods may include, when the conversation is a first conversation, after receiving a status update that may be "CLOSED": selecting a new support bot; initiating a second conversation with the new support bot; and replying to the user inquiry based on the second conversation.

The methods may include receiving from a first service provider an electronic request to register a first support bot to participate in text conversations with a user-facing bot. The methods may include receiving from a second service provider an electronic request to register a second support bot to participate in text conversations with the user-facing bot. The methods may include transmitting to the first service provider a protocol for the conversations. The methods may include transmitting to the second service provider the protocol. The protocol may define an OPEN status indicating a conversation OPEN condition. The protocol may define a WAITING status indicating that a support bot may be waiting for supplemental information from the user-facing bot. The protocol may define a CLOSED status indicating that the support bot has provided to the user-facing bot a complete response.

The protocol may be configured to provide to the user-facing bot a per-day throughput of 100,000,000 responses to users. Each of the responses may include information provided by a support bot.

A response may be defined as answering, by the user-facing bot, a user inquiry, by providing information sourced from a support bot.

The protocol may include an address for establishing a web socket connection.

FIG. 1 is a block diagram that illustrates a computing server 101 (alternatively referred to herein as a "server or computer") that may be used in accordance with the principles of the invention. The server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of server 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, server 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), and voice input and speech recognition applications.

Computing server 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to perform the functions of one or more of a robotic information service platform, a user-facing bot, a support bot and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
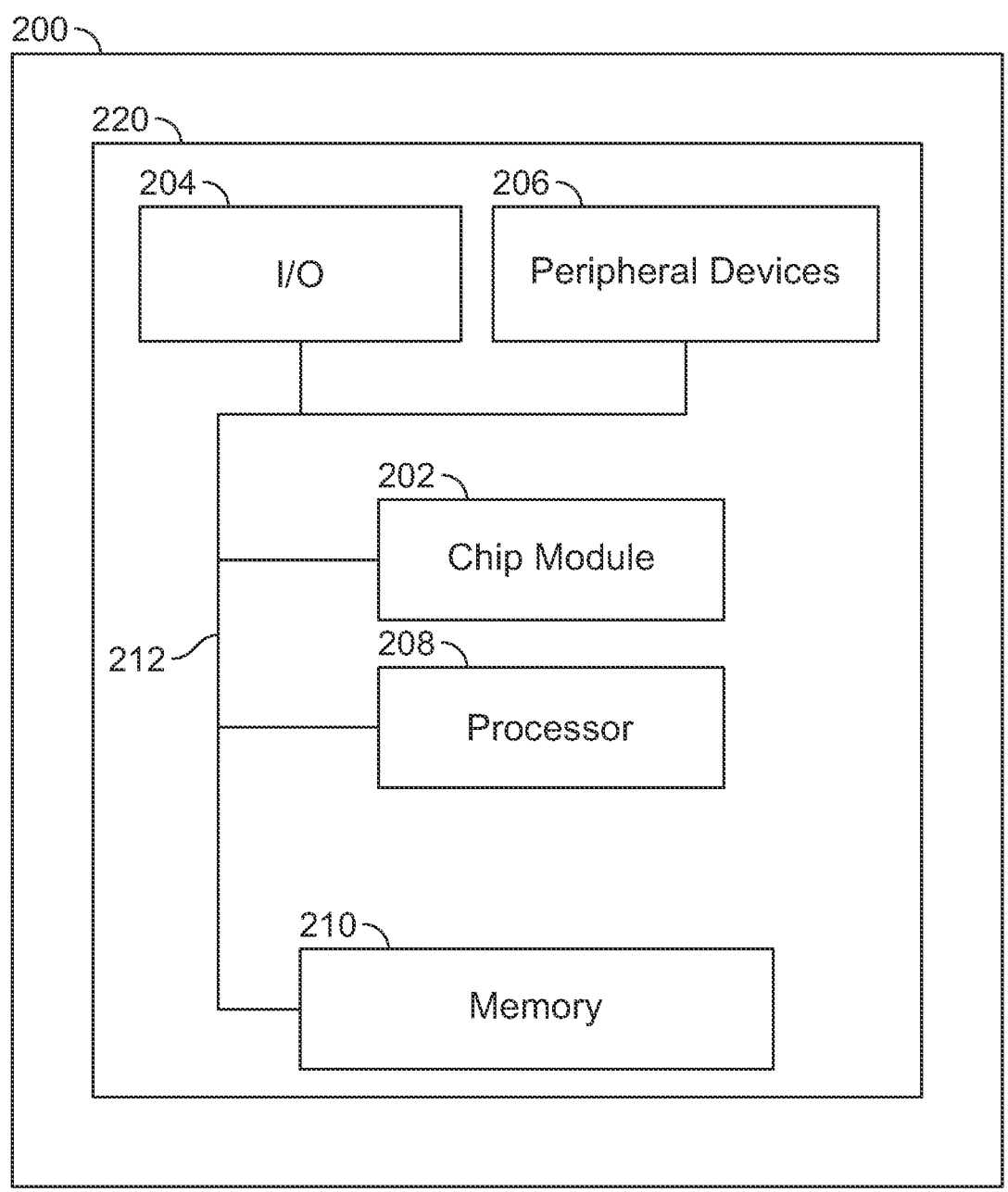
FIG. 2 shows an illustrative apparatus in accordance with principles of the invention.

FIG. 2 shows illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may solve equations and perform other methods described herein; and machine-readable memory 210.

Machine-readable memory 210 may be configured to store in machine-readable data structures associated with selecting a support bot, processing a conversation status, distributing a conversation protocol and any other suitable information or data structures.

Components 202, 204, 206, 208 and 210 may be coupled together by a system bus or other interconnections 212 and may be present on one or more circuit boards such as 220. In some embodiments, the components may be integrated into a single chip.

The chip may be silicon-based.

Figure 3:
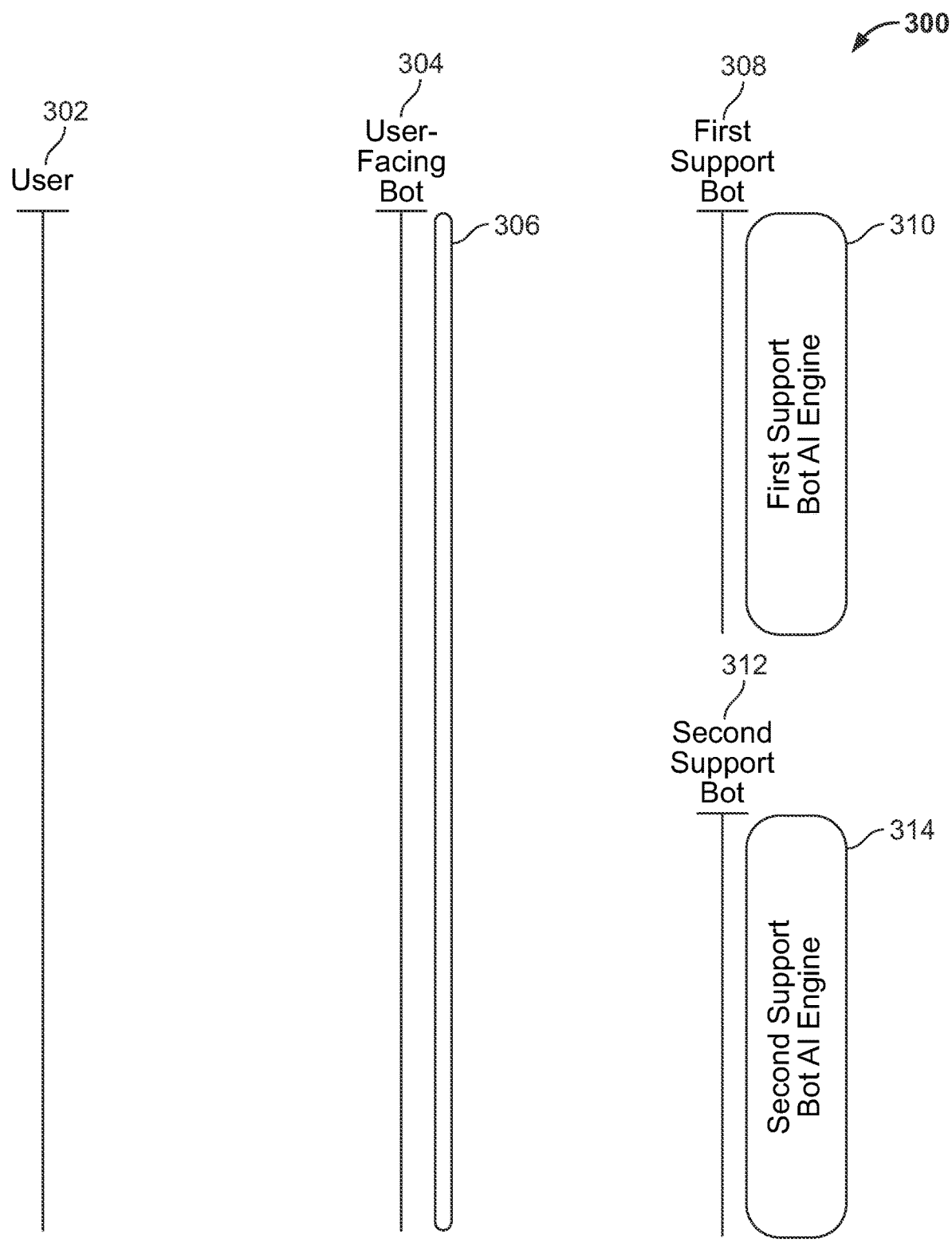
FIG. 3 shows an illustrative schema in accordance with principles of the invention.

FIG. 3 shows illustrative node arrangement 300. Arrangement 300 may include user 302. Arrangement 300 may include user-facing bot 304. User-facing bot 304 may include decision engine 306. Arrangement 300 may include first support bot 308. First support bot 308 may include first support bot AI engine 310. Arrangement 300 may include second support bot 312. Second support bot 312 may include second support bot AI engine 314.

User 302 may be one of hundreds, thousands or millions of users that may send inquiries to user-facing bot 304. User-facing bot 304 may provide a query, based on the user inquiry, to one of a plurality of support bots such as first support bot 308 and second support bot 312. This may establish a conversation between user-facing bot 304 and the selected support bot. The selected support bot may derive a response to the query using it own AI engine. The AI engine may provide a deep-learning analysis. The AI engine may provide to first support bot 308 a response to the query. The response may include information that is responsive to the query. User-facing bot 304 may provide the responsive information to user 302. The responsive information may include substantive information corresponding to or in fulfillment of a user inquiry. The responsive information may include requests for supplemental information. The responsive information may include conversation status information. User-facing bot 304 may transmit a request for the supplemental information to user 302. The user may interact only with user-facing bot 304, and not with support bot 308, support bot 312, or any other support bot.

Figure 4:
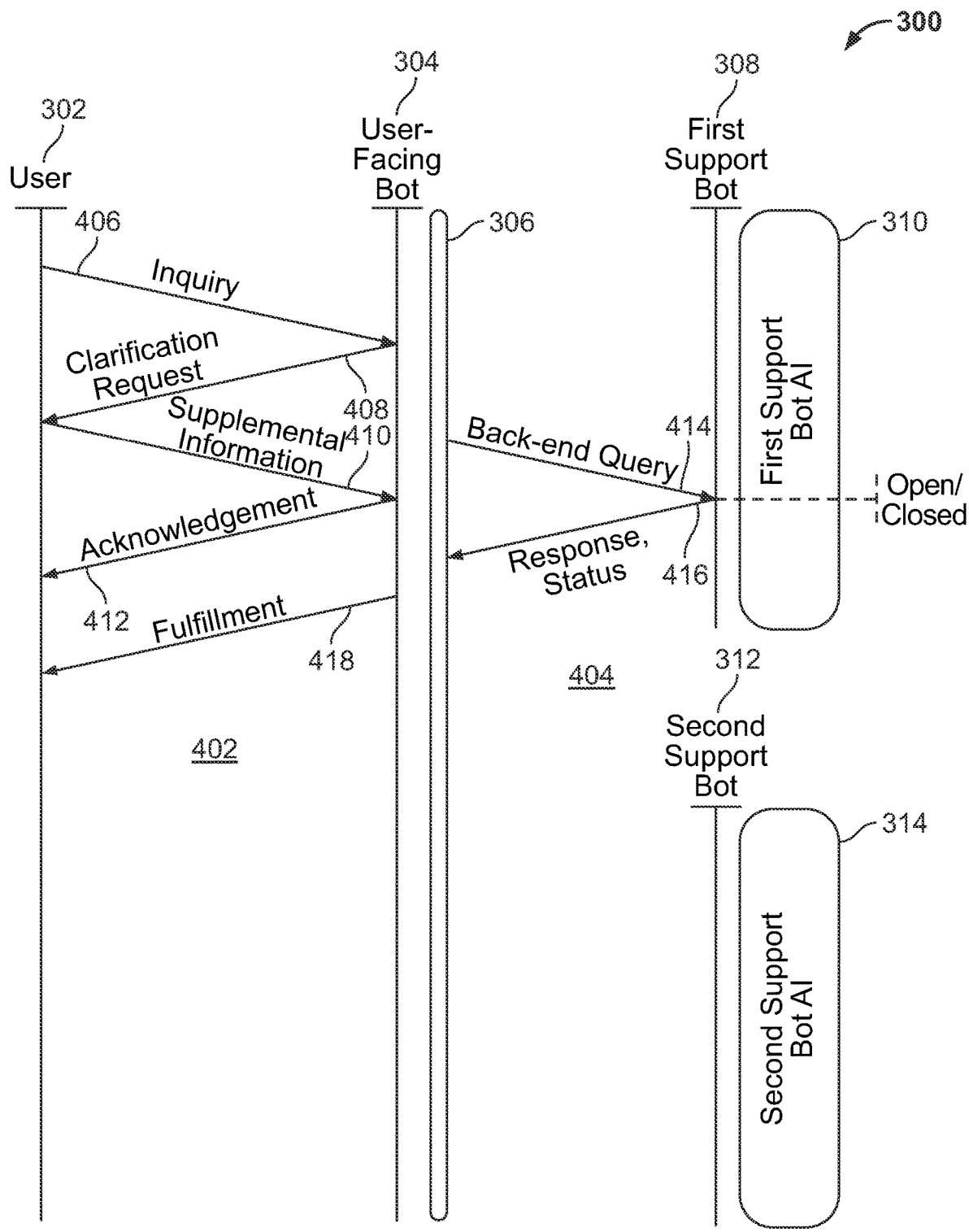
FIG. 4 shows an illustrative schema in accordance with principles of the invention.

FIG. 4 shows illustrative conversation 402 and illustrative conversation 404 that may take place in the context of arrangement 300. Conversation 402 may be between user 302 and user-facing bot 304. Conversation 404 may take place between user-facing bot 304 and first support bot 308.

In conversation 402, user 302 may transmit to user-facing bot 304 inquiry 406. User-facing bot 304 may attempt to select the appropriate support bot to handle the inquiry. If user-facing bot 304 cannot converge on which support bot to select, user-facing bot 304 may send to user 302 clarification request 408. User 302 may provide supplemental information 410 to supplement inquiry 406. Using supplemental information 410, user-facing bot 304 may converge on a selection of first support bot 308 for providing a response to query 406. After the convergence, user-facing bot 304 may provide acknowledgement 412 to user 302.

User-facing bot 304 may transmit to first support bot 308 inquiry 406, with supplemental information 410, in back-end query 414 of conversation 404.

First support bot 308 may provide back-end query 414 to first support bot AI engine 310. First support bot AI engine 310 may set a status of conversation 404 to OPEN. First support bot 308 may transmit the status to user-facing bot 304. First support bot AI engine 310 may derive response 416. First support bot 308 may transmit to user-facing bot 304 response 416. If first support bot AI engine 310 deems response 416 to be a complete response, first support bot AI engine 310 may close conversation 404. First support bot AI engine 310 may set a status of conversation 404 to CLOSED. First support bot 308 may transmit the status to user-facing bot 304. User-facing bot 304 may now be required to OPEN a new conversation with first support bot 308 if necessary to provide further service to user 302.

User-facing bot 304 may package response 416 into fulfillment 418 of conversation 402.

Figure 5:
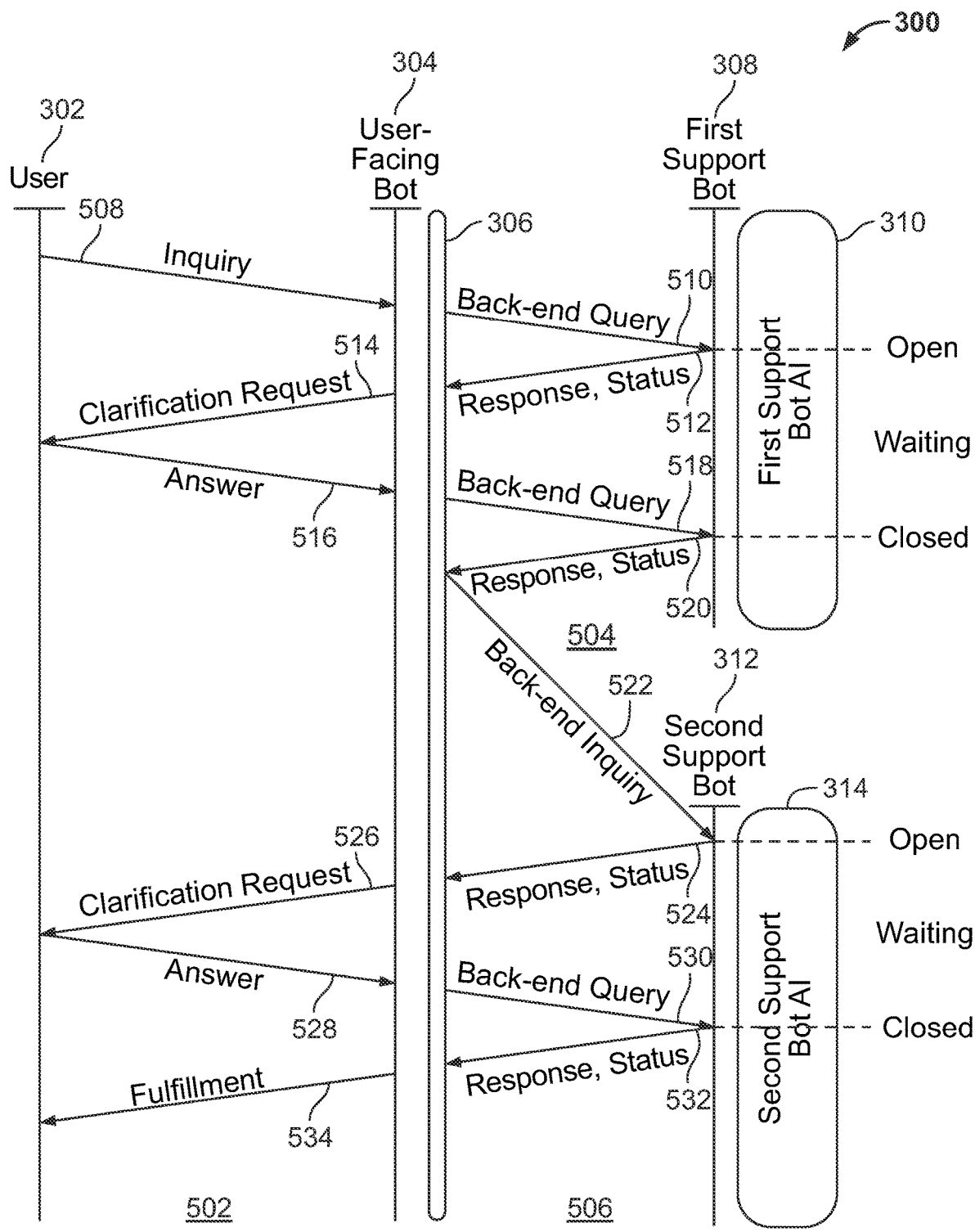
FIG. 5 shows an illustrative schema in accordance with principles of the invention.

FIG. 5 shows illustrative conversation 502, illustrative conversation 504 and illustrative conversation 506 that may take place in the context of arrangement 300. Conversation 502 may take place between user 302 and user-facing bot 304. Conversation 504 may take place between user-facing bot 304 and first support bot 308. Conversation 504 may take place between user-facing bot 304 and second support bot 312.

In conversation 502, user 302 may transmit to user-facing bot 304 inquiry 508. User-facing bot 304 may select first support bot 308 as the appropriate support bot for providing a response to inquiry 508. User-facing bot 304 may transmit back-end query 510 to first support bot 308. First support bot AI engine 310 may set a status of conversation 504 to OPEN. Support bot 308 may provide response 512 to query 510. First support bot 308 may transmit the status to user-facing bot 304. After transmitting response 512, support bot 308 may set the status of conversation 504 to WAITING. Response 512 may include a request for supplemental information.

User-facing bot 304 may, in response to the request for supplemental information, revert to user 302 by transmitting clarification request 514 to user 302. During the reversion to conversation 502, conversation 504 may be retained in an OPEN state, e.g., via a web-socket connection. User 302 may, in response to clarification request 514, provide to user-facing bot 304 answer 516. User-facing bot 304 may supplement back-end query 514 with information from answer 516, and transmit to support bot 308 back-end query 518. First support bot AI engine 310 may process back-end query 518. First support bot AI engine 310 may derive from back-end query 518 response 520. After transmitting response 520, support bot 308 may set the status of conversation 504 to CLOSED. Closed may indicate that first support bot AI engine 310 has responded to back-end inquiry 518 in full. A response "in full" may mean that first support bot AI engine 310 is unable to perform further analysis on back-end query 518 and is unable to formulate a further request for supplemental information. A response "in full" may mean that first support bot AI engine 310 provided a complete and accurate response to back-end inquiry 518.

Decision engine 306 may determine that response 520 is incomplete or inaccurate. Decision engine 306 may use information from one or more of inquiry 508, response 512, answer 516 and response 520 to select a different support bot to derive a response to inquiry 508, with or without information from answer 516.

After the closing of conversation 504, user-facing bot 304 may transmit back-end query 522 to second support bot 312. Back-end query 522 may be formulated based on one or more of inquiry 508, response 512, answer 516 and response 520.

Second support bot AI engine 312 may set a status of conversation 506 to OPEN. Support bot 308 may provide response 524 to query 522. First support bot 308 may transmit the status to user-facing bot 304. After transmitting response 524, support bot 308 may set the status of conversation 506 to WAITING. Response 524 may include a request for supplemental information.

User-facing bot 304 may, in response to the request for supplemental information, revert to user 302 by transmitting clarification request 526 to user 302. During the reversion to conversation 502, conversation 506 may be retained in an OPEN state, e.g., via a web-socket connection. User 302 may, in response to clarification request 526, provide to user-facing bot 304 answer 528. User-facing bot 304 may supplement back-end query 522 with information from answer 528, and transmit to support bot 308 back-end query 530. Second support bot AI engine 312 may process back-end query 530. Second support bot AI engine 312 may derive from back-end query 530 response 532. After transmitting response 532, support bot 308 may set the status of conversation 506 to CLOSED.

Decision engine 306 may determine that response 520 is complete or accurate. Decision engine 306 may transmit to user 302 fulfillment 534. User-facing bot 304 may thus provide to user 302 fulfillment of inquiry 508 without requiring user 302 to engage in a conversation other than conversation 502.

Figure 6:
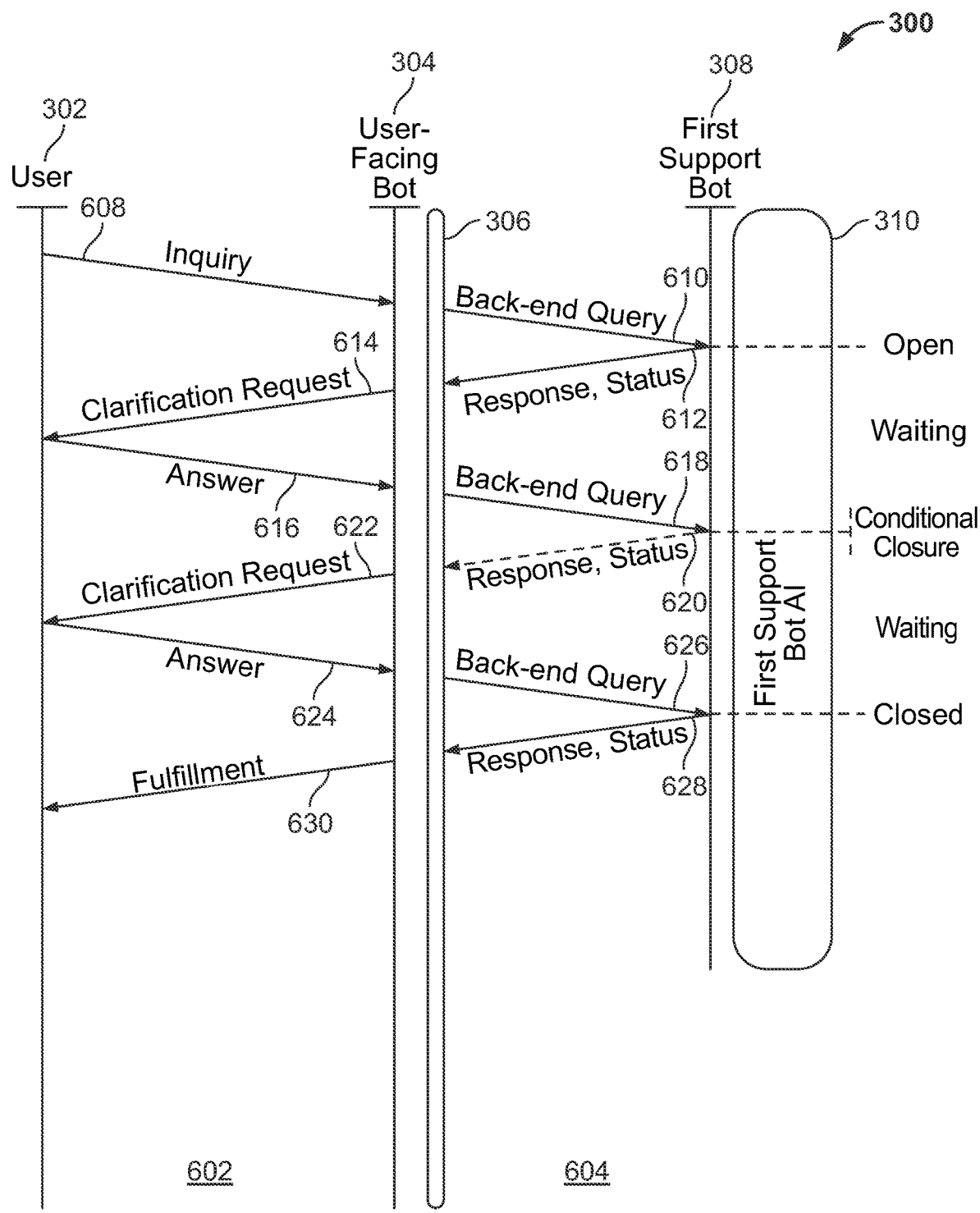
FIG. 6 shows an illustrative schema in accordance with principles of the invention.

FIG. 6 shows illustrative conversation 602 and illustrative conversation 604 that may take place in the context of arrangement 300. Conversation 602 may take place between user 302 and user-facing bot 304. Conversation 604 may take place between user-facing bot 304 and first support bot 308. Conversation 604 may take place between user-facing bot 304 and first support bot 308.

In conversation 602, user 302 may transmit to user-facing bot 304 inquiry 608. User-facing bot 304 may first support bot 308 as the appropriate support bot for providing a response to inquiry 608. User-facing bot 304 may transmit back-end query 610 to first support bot 308. First support bot AI engine 310 may set a status of conversation 604 to OPEN. Support bot 308 may provide response 612 to query 610. First support bot 308 may transmit the status to user-facing bot 304. After transmitting response 612, support bot 308 may set the status of conversation 604 to WAITING. Response 612 may include a request for supplemental information.

User-facing bot 304 may, in response to the request for supplemental information, revert to user 302 by transmitting clarification request 614 to user 302. During the reversion to conversation 602, conversation 604 may be retained in an OPEN state, e.g., via a web-socket connection. User 302 may, in response to clarification request 614, provide to user-facing bot 304 answer 616. User-facing bot 304 may supplement back-end query 610 with information from answer 616, and transmit to support bot 308 back-end query 618. First support bot AI engine 310 may process back-end query 618. First support bot AI engine 310 may derive from back-end query 618 response 620. After transmitting response 620, support bot 308 may set the status of conversation 604 to conditionally CLOSED. Conditionally CLOSED may indicate that first support bot AI engine 310 has responded to back-end inquiry 618 in full and is keeping conversation 604 OPEN to allow user 302 to transmit a second query. Because conditionally CLOSED retains a conversation as OPEN, information from one or more of back-end query 610 and back-end query 618 inquiry 608 may remain available to first support bot AI engine 310 to refine or accelerate a response to the second query. Conditionally CLOSED may indicate that first support bot AI engine 310 provided a complete and accurate response to back-end inquiry 618, and is remaining OPEN to process a second query, if any is to come.

After receiving the conditional closing of conversation 604, user-facing bot 304 may transmit to user 302 any substantive information included in response 620.

User-facing bot 304 may, in response to the conditional closing, revert to user 302 by transmitting clarification request 622 to user 302. During the reversion to conversation 602, conversation 604 may be retained in an OPEN state, e.g., via a web-socket connection. User 302 may, in response to clarification request 622, provide to user-facing bot 304 answer 624. Answer 624 may include the second inquiry. User-facing bot 304 may transmit to support bot 308 back-end query 626 which may correspond to the second inquiry. First support bot AI engine 310 may process back-end query 626. First support bot AI engine 310 may derive from back-end query 626 response 628. After transmitting response 628, support bot 308 may set the status of conversation 604 to CLOSED.

Figure 7:
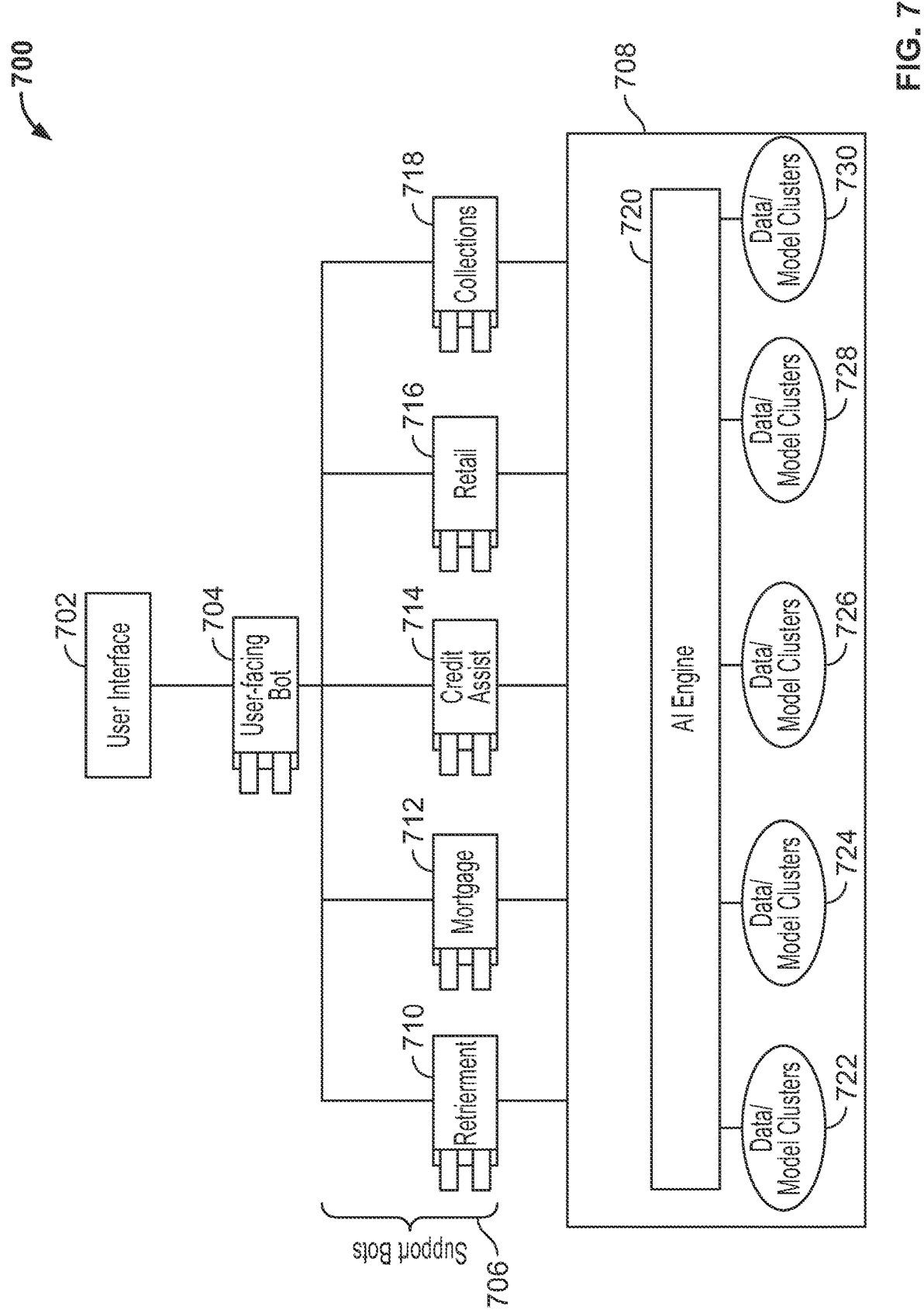
FIG. 7 shows illustrative apparatus in accordance with principles of the invention.

FIG. 7 shows illustrative arrangement 700. Arrangement 700 may include user interface 702. Arrangement 700 may include user-facing bot 704. Arrangement 700 may include suite 706 of support bots. Arrangement 700 may include research engine 708.

User interface 702 may interact with a user such as user 302. User interface 702 may provide user 302 with access to user-facing bot 704. User-facing bot 704 may have one or more features in common with user-facing bot 304. User-facing bot 704 may be in communication with one or more support bots of support bot suite 706. The support bots of suite 706 may have one or more features in common with support bots 308 and 312. Support bot suite 706 may include retirement expert support bot 710. Support bot suite 706 may include mortgage expert support bot 712. Support bot suite 706 may include credit assist expert support bot 714. Support bot suite 706 may include retail expert support bot 716. Support bot suite 706 may include collections expert support bot 718. Other support bots (not shown) may be expert in any suitable subject matter, such as science, history, law, medicine, travel or any other suitable subject matter.

Research engine 708 may include AI engine 720. Research engine 708 may include data/model clusters 722, 724, 726, 728 and 730. The support bots of suite 706 may extract learned information from research engine 708.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

For the sake of illustration, the steps of the illustrated processes will be described as being performed by a "system." A "system" may include one or more of the features of the apparatus and scheme that are shown in FIG. 1-FIG. 7 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative process may include steps shown in connection with another illustrative process.

Figure 8:
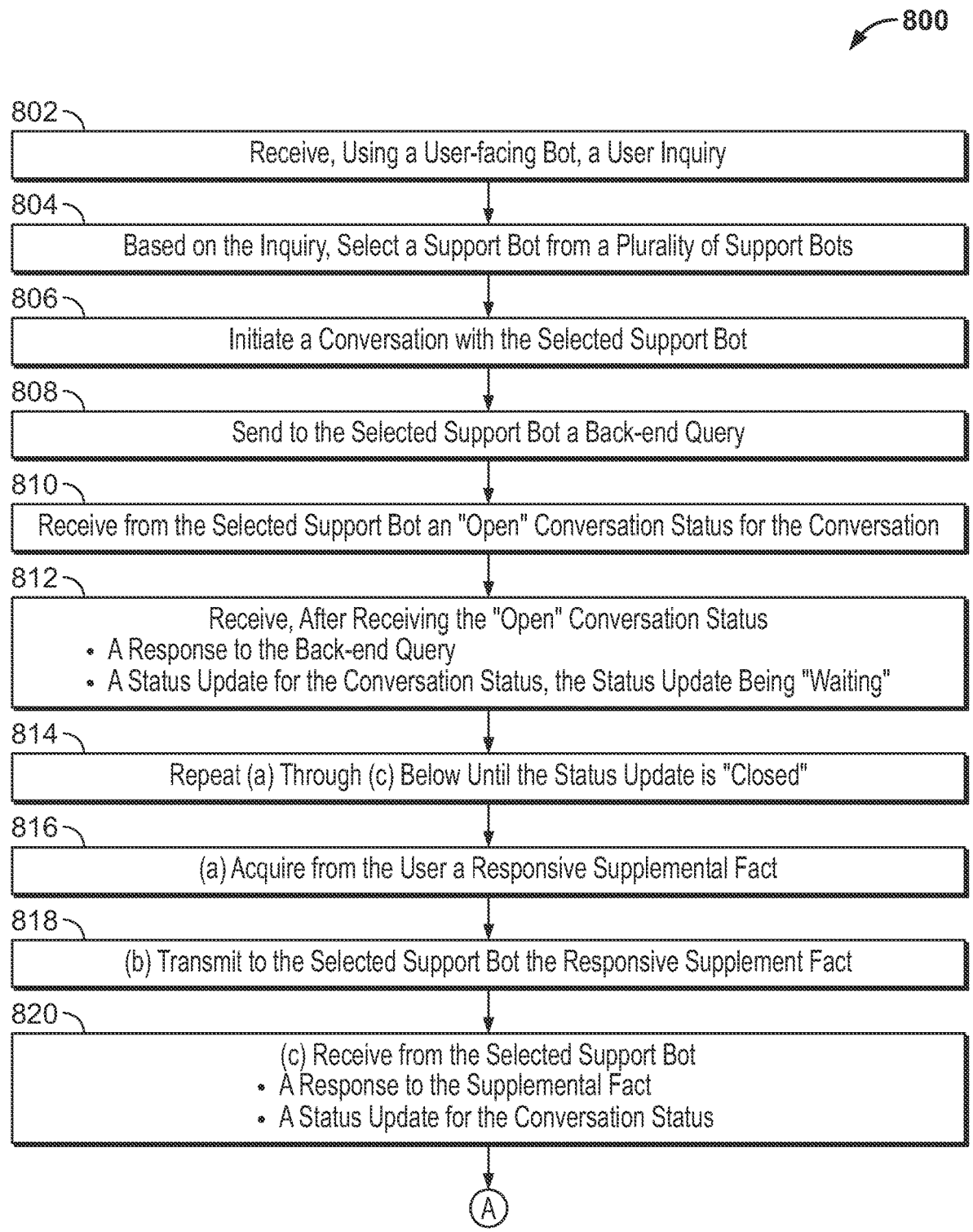
FIG. 8 shows illustrative steps of a process in accordance with principles of the invention.
Figure 8:
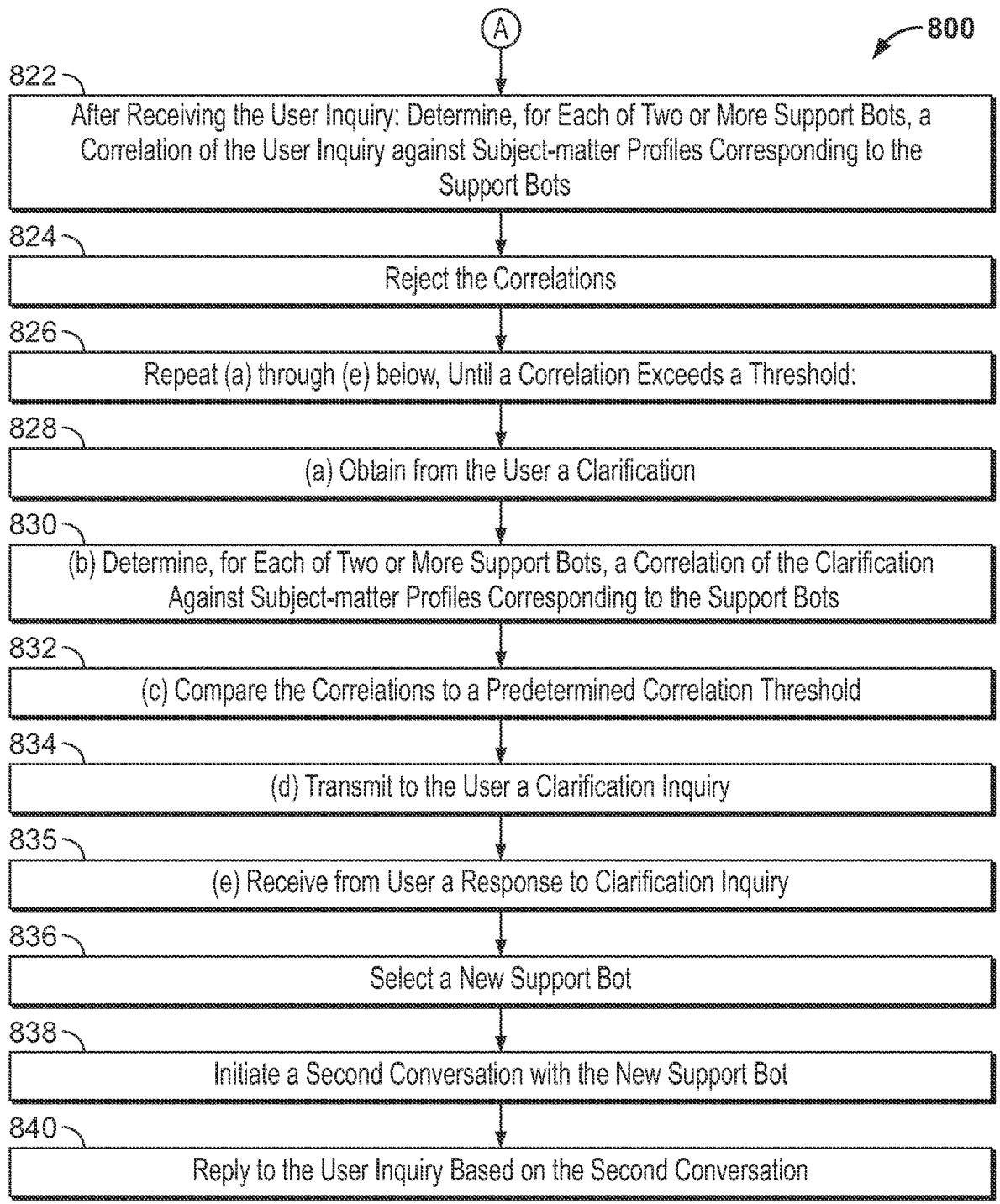

FIG. 8 shows illustrative steps of process 800 for gathering information from layered bots. Process 800 may begin at step 802. At step 802, the system may receive, using a user-facing bot, a user inquiry. At step 804, the system, based on the inquiry, may select a support bot from a plurality of support bots. At step 806, the system may initiate a conversation with the selected support bot. At step 808, the system may send to the selected support bot a back-end query. At step 810, the system may receive from the selected support bot an "OPEN" conversation status for the conversation. At step 812, the system may receive, after, or concurrently with, or before receiving the "OPEN" conversation status: a response to the back-end query; and a status update for the conversation status that updates the status to "WAITING." At step 814, an iteration may be initiated. The iteration may repeat the following three steps (816, 818 and 820) until the status is updated to "CLOSED." At step 816, the system may acquire from the user a responsive supplemental fact. At step 818, the system may transmit to the selected support bot the responsive supplemental fact. At step 820, the system may receive from the selected support bot: a response to the supplemental fact; and a status update for the conversation status.

At step 822, the system may, after receiving the user inquiry: determine, for each of two or more support bots, a correlation of the user inquiry against subject-matter profiles corresponding to the support bots. At step 824, the system may reject the correlations. At step 826, an iteration may be initiated. The iteration may repeat the following four steps (828, 830, 832 and 836) until the correlation exceeds a predetermined threshold. At step 828, the system may obtain from the user a clarification. At step 830, the system may determine, for each of two or more support bots, a correlation of the clarification against subject-matter profiles corresponding to the support bots. At step 832, the system may compare the correlations to a predetermined correlation threshold. At step 834, the system may transmit to the user a clarification inquiry. At step 835, the system may receive from the user a response to the clarification inquiry.

At step 836, the system may, after receiving a "CLOSED" status update for the conversation, select a new support bot. At step 838, the system may initiate a new conversation with the new support bot. At step 840, the system may reply to the user inquiry based on the new conversation.

Figure 9:
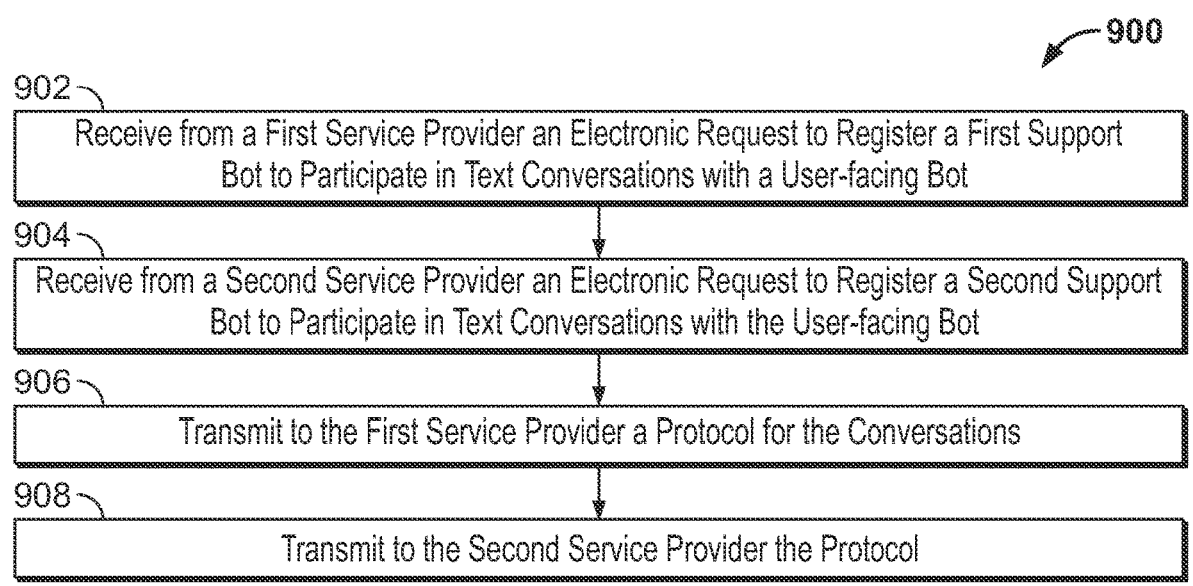
FIG. 9 shows illustrative steps of a process in accordance with principles of the invention.

FIG. 9 shows illustrative steps of process 900 for gathering information from layered bots. Process 900 may begin at step 902. At step 902, the system may receive from a first service provider an electronic request to register a first support bot to participate in text conversations with a user-facing bot. At step 904 the system may receive from a second service provider an electronic request to register a second support bot to participate in text conversations with the user-facing bot. At step 906, the system may transmit to the first service provider a protocol for the conversations. At step 908, the system may transmit to the second service provider the protocol. The protocol may define one or more of: (a) an OPEN status indicating a conversation OPEN condition; (b) a WAITING status indicating that a support bot is waiting for supplemental information from the user-facing bot; and (c) a CLOSED status indicating that the support bot has provided to the user-facing bot a complete response.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for gathering information from layered bots have been provided. Persons skilled in the art will appreciate that the present invention may be practiced by other than the described embodiments, which are presented for purposes of illustration rather than of limitation. The present invention is limited only by the claims that follow.

What is claimed is:

1. Apparatus for interbot consultation, the apparatus comprising a platform that is configured to:
   run an instance of a user-facing bot;
   distribute an interbot communication protocol to support bots;
   engage in conversations between users and the support bots; receive, using a user-facing bot, a user inquiry;
   based on the inquiry, select a support bot from the support bots, the support bots including:
      a first support bot that operates under a first proprietary artificial intelligence ("AI") protocol; and
      a second support bot that operates under a second proprietary AI protocol that is different from the first AI protocol;
   initiate a conversation with the selected support bot;
   send to the selected support bot a back-end query;
   receive from the selected support bot an "OPEN" conversation status for the conversation;
   receive, after receiving the "OPEN" conversation status:
      a response to the back-end query; and
      a status update for the conversation status, the status update being "WAITING";
   repeat (a) through (c) below until the status update is "CLOSED":
      (a) acquire from the user a responsive supplemental fact;
      (b) transmit to the contact bot the responsive supplemental fact;

(c) receive from the contact bot:
  a response to the supplemental fact; and
  a status update for the conversation status.

2. The apparatus of claim 1 wherein the conversation is performed over a web socket interface.

3. The apparatus of claim 1 wherein the user inquiry includes a text message.

4. The apparatus of claim 1 wherein the back-end query includes a text message.

5. The apparatus of claim 1 wherein the response to the back-end query includes a text message.

6. The apparatus of claim 1 wherein the response to the back-end query includes a text message.

7. The apparatus of claim 1 wherein the user inquiry is one of over 100,000,000 user inquiries received in a 24-hour period by the user-facing bot.

8. The apparatus of claim 1 wherein, when the conversation is a first conversation, the platform is further configured to, after receiving a status update that is "CLOSED":
  select a new support bot;
  initiate a second conversation with the new support bot; and
  reply to the user inquiry based on the second conversation.

9. A method for gathering information from layered bots, the method comprising:
  receiving, using a user-facing bot, a user inquiry;
  based on the inquiry, selecting a support bot from a plurality of bots, the plurality of bots including:
    a first support bot that:
      was developed by a first entity; and
      operates under a first proprietary artificial intelligence ("AI") protocol; and
    a second support bot that:
      was developed by a second entity; and
      operates under a second proprietary AI protocol that is different from the first proprietary AI protocol;
  initiating a conversation with the selected support bot;
  sending to the selected support bot a back-end query;
  receiving from the contact bot an "OPEN" conversation status for the conversation;
  receiving, after receiving the "OPEN" conversation status:
    a response to the back-end query; and
    a status update for the conversation status, the status update being "WAITING";
  repeating (a) through (c) below until the status update is "CLOSED":
    (a) acquiring from the user a responsive supplemental fact;
    (b) transmitting to the contact bot the responsive supplemental fact;
    (c) receiving from the contact bot:
      a response to the supplemental fact; and
      a status update for the conversation status.

10. The method of claim 9 wherein the conversation is performed over a web socket interface.

11. The method of claim 9 wherein the user inquiry includes a text message.

12. The method of claim 9 wherein the back-end query includes a text message.

13. The method of claim 9 wherein the response to the back-end query includes a text message.

14. The method of claim 9 wherein the response to the back-end query includes a text message.

15. The method of claim 9 wherein the user inquiry is one of over 100,000,000 user inquiries received in a 24-hour period by the user-facing bot.

16. The method of claim 9 further comprising, after receiving the user inquiry:
  determining, for each of two or more support bots, a correlation of the user inquiry against subject-matter profiles corresponding to the support bots;
  rejecting the correlations; and
  repeating (a) through (e) below, until a correlation exceeds a threshold:
    (a) obtaining from the user a clarification;
    (b) determining, for each of two or more support bots, a correlation of the clarification against subject-matter profiles corresponding to the support bots;
    (c) comparing the correlations to a predetermined correlation threshold;
    (d) transmitting to the user a clarification inquiry; and
    (e) replying to the user inquiry based on the conversation.

17. The method of claim 9 further comprising, when the conversation is a first conversation, after receiving a status update that is "CLOSED":
  selecting a new support bot;
  initiating a second conversation with the new support bot; and
  replying to the user inquiry based on the second conversation.

18. A method for gathering information from layered bots, the method comprising:
  receiving from a first service provider an electronic request to register a first support bot to participate in text conversations with a user-facing bot;
  receiving from a second service provider an electronic request to register a second support bot to participate in text conversations with the user-facing bot;
  transmitting to the first service provider a protocol for the conversations; and
  transmitting to the second service provider the protocol;
  wherein the protocol defines:
    an OPEN status indicating a conversation OPEN condition;
    a WAITING status indicating that a support bot is waiting for supplemental information from the user-facing bot; and
    a CLOSED status indicating that the support bot has provided to the user-facing bot a complete response.

19. The method of claim 18 wherein the protocol is configured to provide to the user-facing bot a per-day throughput of 100,000,000 responses to users, the responses including information provided by a support bot.

20. The method of claim 18 wherein:
  a response is defined as answering, by the user-facing bot, a user inquiry, the answering including providing information provided by a support bot; and
  the protocol is configured to enable 100,000,000 responses per day.

21. The method of claim 18 wherein the protocol further comprises an address for establishing a web socket connection.

* * * * *